United States Patent [19]

Adachi

[11] Patent Number: 4,797,086
[45] Date of Patent: Jan. 10, 1989

[54] APPARATUS CLUTCH CONTROLLED CLOSURE MEANS FOR A MOLDING

[75] Inventor: Taira Adachi, Sakura, Japan
[73] Assignee: Sumitomo Heavy Industries Ltd, Tokyo, Japan
[21] Appl. No.: 86,127
[22] PCT Filed: Nov. 17, 1986
[86] PCT No.: PCT/JP86/00585
  § 371 Date: Jul. 16, 1987
  § 102(e) Date: Jul. 16, 1987
[87] PCT Pub. No.: WO87/02931
  PCT Pub. Date: May 21, 1987

[30] Foreign Application Priority Data

Nov. 18, 1985 [JP] Japan ............... 60-258320
Apr. 21, 1986 [JP] Japan ............... 61-91742
Jun. 24, 1986 [JP] Japan ............... 61-147675

[51] Int. Cl.$^4$ ............................ B29C 45/64
[52] U.S. Cl. ................... 425/589; 192/48.3; 192/97; 425/590; 425/DIG. 223
[58] Field of Search ............... 192/48.2, 48.3, 52, 192/84 AA, 94, 96, 97; 425/589, 540, DIG. 221, DIG. 223

[56] References Cited

U.S. PATENT DOCUMENTS 2,332,862 10/1943 Tourneau ............... 192/94
2,521,607 9/1950 Rohn ............... 192/97

FOREIGN PATENT DOCUMENTS 51-13495 4/1976 Japan ............... 425/589
60-125619 7/1985 Japan ............... 425/589

Primary Examiner—Jay H. Woo
Assistant Examiner—C. Scott Bushey
Attorney, Agent, or Firm—Armstrong, Nikaido, Marmelstein & Kubovcik

[57] ABSTRACT

A molding machine which performs molding by means of one mold part held by a fixed platen and the other mold part held by a movable platen movable toward and away from the one mold part. A shaft having an axis extending in the direction of reciprocal movement of the movable platen is disposed on a stationary frame for rotation with respect thereto and for reciprocal movement along the axis of the shaft, and is rotated by an electrical motor. First and second nut members are respectively screwed onto first and second threaded portions formed along the axis of the shaft. The first nut member is secured to one of the stationary frame and the movable platen while the second nut member is capable of being rigidly coupled with the other thereof via a clutch. While the shaft is being rotated, the second nut member is rigidly coupled with the other of the stationary frame and the movable platen via the clutch, a relative movement is produced between the shaft and the first and second nut members. Also, when the second nut member is released from rigid coupling with respect to the other of the stationary frame and the movable platen via the clutch, a relative movement is produced between the shaft and the first nut member, but, since the second nut member is rotated together with the shaft, no relative movement is produced therebetween.

7 Claims, 4 Drawing Sheets

APPARATUS CLUTCH CONTROLLED CLOSURE MEANS FOR A MOLDING

BACKGROUND ART

The present invention relates to a molding machine which is arranged to perform molding with the use of at least one mold constituted by a pair of mold parts, and more particular to a mold clamping apparatus for use with an injection molding machine employing an electrical motor.

TECHNICAL FIELD

Japanese Patent Unexamined Publication No. 125619/1985 discloses a mold clamping apparatus for use with an injection molding machine of the type which has a fixed platen holding one of a pair of mold parts. The mold clamping apparatus has a shaft rotatably supported by a stationary frame. One end of the shaft is drivably coupled with an electrical motor and the portion of the shaft adjacent to the end has a first threaded portion while the portion of the same adjacent to the other end has a second threaded portion with a lead smaller than that of the first threaded portion. First and second nut members are respectively screwed onto the first and second threaded portions, the first and second nut members capable of being rigidly coupled with a rod via first and second clutches, respectively. The rod is rigidly coupled with a movable platen which holds the other of the aforesaid pair of mold parts and which is disposed for reciprocal movement toward and away from the aforesaid one of the same pair. The first clutch is capable of traveling between an engagement position which allows the first nut member to be moved along the shaft during rotation of the shaft with the first nut member rigidly coupled with the rod and a disengagement position which allows the first nut member to be moved along with the shaft during rotation of the shaft with the first nut member released from such rigid coupling with respect to the rod. The second clutch is likewise capable of traveling between an engagement position which allows the second nut member to be moved along the shaft during rotation of the shaft with the second nut member rigidly coupled with the rod and a disengagement position which allows the second nut member to be moved along with the shaft during rotation of the shaft with the second nut member released from such rigid coupling with respect to the rod.

Mold closing is performed as follows. The first clutch is placed in its engagement position while the second clutch is placed in its disengagement position. When the shaft is rotated, the movable platen which holds the one of the pair of mold parts is moved toward the other mold part at a relatively high feed rate in cooperation between the first threaded portion having a relatively large lead and the first nut member screwed onto the same. The mold part held by the movable platen and the mold part held by the fixed platen are combined with each other, thereby completing the mold closing step.

Upon completion of mold closing, the first clutch is placed in its disengagement position while the second clutch is placed in its engagement position. When the shaft is rotated, the other mold part is forced against the one at a relative slow speed, that is, with a relatively large mold clamping force, in cooperation between the second threaded portion with a relatively small lead and the second nut member screwed thereonto.

The above-described mold clamping apparatus of the prior art has advantage in that the opening and closing of the mold at a relatively high feed rate and mold clamping with a large mold clamping force can be performed by means of an electrical motor with a relatively small capacity and in that the molding cycle can be reduced. However, when either of the first and second nut members is rigidly coupled with the rod, the other thereof is necessarily released from rigid coupling with respect to the rod. It is therefore necessary to form the first and second threaded portions along the axis of the shaft over a relatively long range thereof. Accordingly, the shaft must be lengthened and this may result in the disadvantage that the overall size of the molding machine increases.

It is therefore an object of the present invention to provide a molding machine which possesses the advantage of the prior art and yet the overall size of which can be reduced.

DISCLOSURE OF INVENTION

The present invention provides a molding machine which is arranged to perform molding by means of at least one mold constituted by a pair of mold parts, comprising:

a stationary frame;

a fixed platen holding one of the pair of mold parts;

a movable platen holding the other of the pair of mold parts, the movable platen being attached to the stationary frame for reciprocal movement with respect to the fixed platen in the direction toward and away from the one of the pair of mold parts;

a shaft having an axis extending toward the movable platen, the shaft being supported for rotation with respect to the stationary frame and for reciprocal movement along the axis of the shaft, the shaft having first and second threaded portions formed thereon along the axis of the shaft;

an electrical motor mounted on the stationary frame for causing rotation of the shaft;

first and second nut members screwed onto the respective first and second threaded portions of the shaft, the first nut member being secured to one of the stationary frame and the movable platen, the first nut member and the shaft being movable with respect to each other when the shaft is rotated, the second nut member capable of being rigidly coupled with the other of the stationary frame and the movable platen; and clutch means disposed between the other of the stationary frame and the movable platen and the second nut member for free movement between an engagement position which allows for relative movement between the shaft and the second nut number while the shaft is being rotated with the second nut member rigidly coupled with the other of the stationary frame and the movable platen and a disengagement position which allows the shaft to be rotated together with the second nut member while the shaft is being rotated with the second nut member released from rigid coupling with respect to the other of the stationary frame and the movable platen.

Accordingly, the molding machine of the present invention is arranged in such a manner that the first and second threaded portions are both used for the purpose of opening and closing the mold, only the first threaded portion being utilized to move the one of the mold parts With respect to the other for the purpose of mold clamping. Alternately, only the second threaded portion is utilized for the purposes of opening and closing the mold while, for mold clamping, the first and second threaded portions are both utilized to move the one of the mold parts with respect to the other Accordingly, the opening and closing of a mold at high speed and mold clamping with a large mold clamping force can be performed by means of an electric motor with a relatively small capacity. In addition, the overall length of the shaft can be reduced, and hence, the overall size of the molding machine can be reduced.

BEST MODE FOR CARRYING OUT THE INVENTION

Embodiments of the present invention will be described in detail below with reference to the accompanying drawings.

Figure 1:
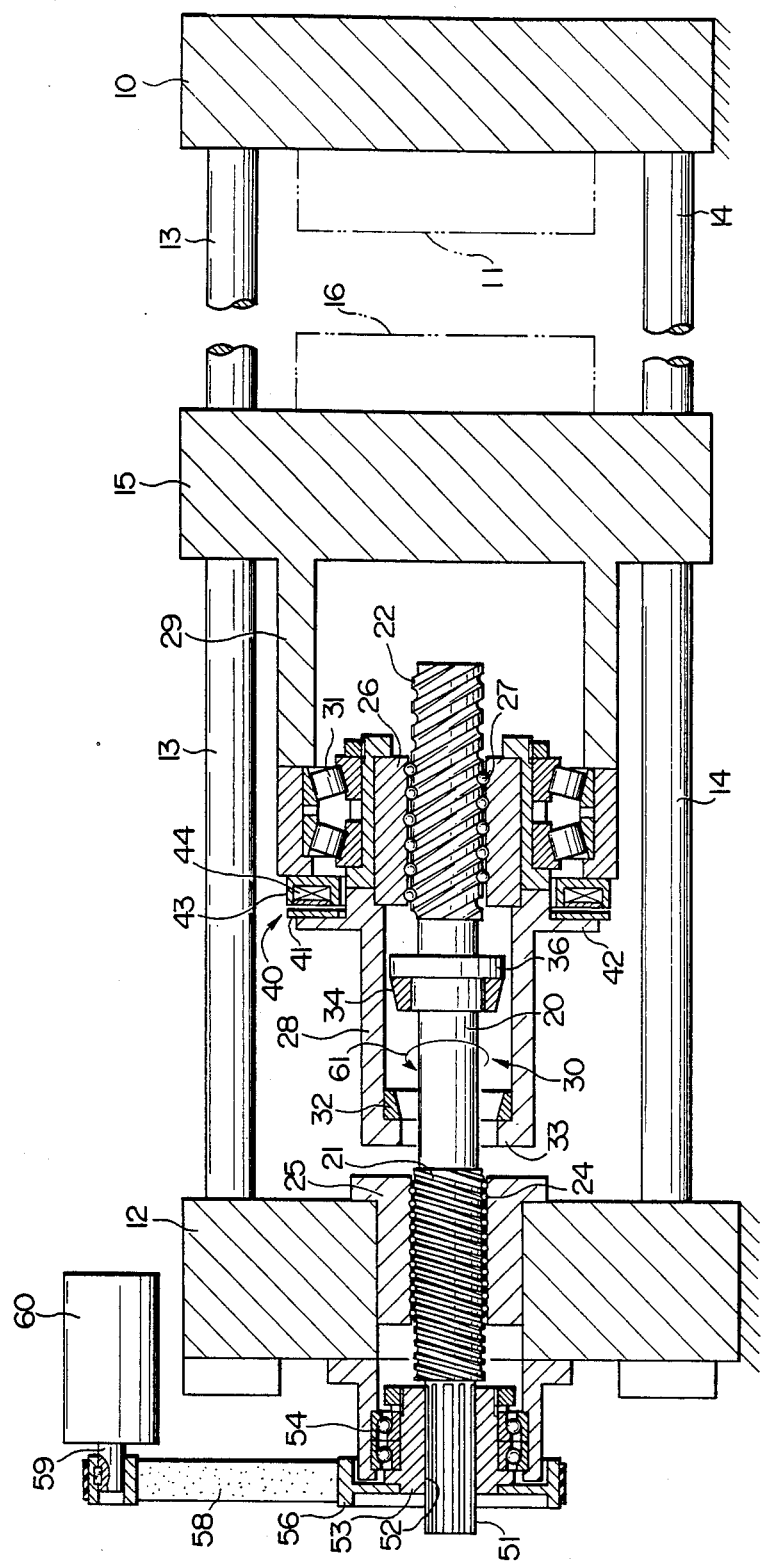
FIG. 1 is a partly sectional view of a first preferred embodiment of a molding machine in accordance with the present invention, showing a state wherein a movable platen holding a mold part is placed at a position where a mold is opened.

FIG. 1 partly shows the first preferred embodiment of an injection molding machine in accordance with the present invention. The injection molding machine includes: a fixed platen 10 holding a mold part 11 which constitutes one of a pair of mold parts; and a stationary frame 12 coupled with the fixed platen 10 via tie bars 13 and 14. A movable platen 15 holding a mold part 16 which constitutes the other of the pair of mold parts is fitted onto the tie bars 13 and 14 for reciprocal movement therealong.

A shaft 20 has an axis which extends in the direction in which the movable platen 15 is moved reciprocally along the tie bars 13 and 14, and is supported for rotation with respect to the stationary frame 12 and for reciprocal movement along the axis of the shaft 20. The shaft 20 is provided with two threaded portions 21 and 22 which are formed along the axis. The threaded portion 21 has a thread which spiral in the opposite directions to the thread of the other threaded portion 22, and has a lead smaller than the lead of the portion 22.

A nut member 25 is screwed onto the threaded portion 21 via a plurality of balls 24, and is rigidly attached to the stationary frame 12. Also, a nut member 26 is screwed onto the threaded portion 22 via a plurality of balls 27. The nut member 26 is rigidly attached to a housing 28, and the housing 28 is rotatably supported via a bearing 31 on a cylindrical projection 29 which is coaxial and integral with the movable platen 15.

A first sliding clutch mechanism 30 is disposed between the housing 28 and the shaft 20, the first sliding clutch mechanism 30 being constituted by a clutch component 32 secured to a radially inward flange 33 which is integral with the housing 28 and a clutch component 34 secured to a radially outward flange 36 which is integral with the shaft 20. The first sliding clutch mechanism 30 is arranged for movement between the disengagement position shown in FIG. 1 and the engagement position shown in FIG. 2.

A second sliding clutch mechanism 40 is disposed between the movable platen 15 and the housing 28, the second sliding clutch mechanism 40 being constituted by: an annular clutch component 41 made of a magnetic material which is disposed on a radially outward flange 42 integral with the housing 28; an annular clutch component 43 secured to the cylindrical projection 29 of the movable platen 15; and a solenoid 44 incorporated in this clutch component 43. The clutch component 41 is supported on the housing 28 for movement along the axis of the shaft 20 but for nonrotation with respect to the housing 28, and is pressed by a spring (not shown) in the direction away from the clutch component 43. While the solenoid 44 is being de-energized, the clutch component 41 is held away from the clutch component 43 by means of the spring (not shown) and the second sliding clutch mechanism 40 takes the disengagement position shown in FIGS. 1 and 2. When the solenoid 44 is energized, the clutch component 41 is attracted by the solenoid 44 against the force of the spring and comes into contact with the clutch component 43. Thus, the second sliding clutch mechanism 40 takes an engagement position (not shown).

The shaft 20 has a male spline 51 at one end thereof on the side opposite to the movable platen 15, and the male spline 51 is meshed With a female spline 52 formed on a rotary member 53. The rotary member 53 is rotatably supported on the stationary frame 12 via a bearing 54. Also, a pulley 56 is secured to the rotary member 53, and the pulley 56 is coupled via a belt 58 with an output shaft 59 of an electrical motor 60 secured to the stationary frame 12.

The operation of the injection molding machine having the above-described construction will be described below. FIG. 1 shows a mold open state wherein the mold part 16 held by the movable platen 15 is positioned away from the mold part 11 held by the fixed platen 10. In such a state, an electrical signal representing the commence of mold closing is supplied to the electrical motor 60 to cause rotation of the output shaft 59. Simultaneously, the second sliding clutch mechanism 40 is moved to its engagement position, and the clutch component 41 is thereby caused to engage with the clutch component 43 to bring the housing 28 into a non-rotatable state with respect to the movable platen 15. Thus, the nut member 26 is rigidly coupled with the movable platen 15. As the consequence, the rotation of the aforesaid motor 60 is transmitted via the belt 58 to the pulley 56 and the rotating member 53, so that the shaft 20 is rotated counterclockwise as viewed in the mold-closing direction in which the mold part 16 approaches the mold part 11 held by the fixed platen 10, that is, in the direction indicated by an arrow 61 in each of FIGS. 1 and 2. When the shaft 20 is rotated, the shaft 20 is moved along its axis in the mold-closing direction by the cooperation between the threaded portion 21 formed on the shaft 20 and the nut member 25 which is secured to the stationary frame 12 and meshed with the portion 21. Also, the shaft 20 is forced to travel counter to the mold closing direction by the cooperation between the threaded portion 22 and the nut member 26 which is rigidly coupled with the movable platen 15 via the second sliding clutch mechanism 40. Therefore, the movable platen 15 is moved along the tie bars 13 and 14 in the direction in which the mold is closed, with the stationary frame 12 serving as a reaction receiver.

Therefore, the movable platen 15 is moved at high speeds equivalent to the rotation of a hypothetical screw having a lead substantially equal to the sum of the leads of the threaded portions 21 and 22, thereby performing a mold-closing step.

Figure 2:
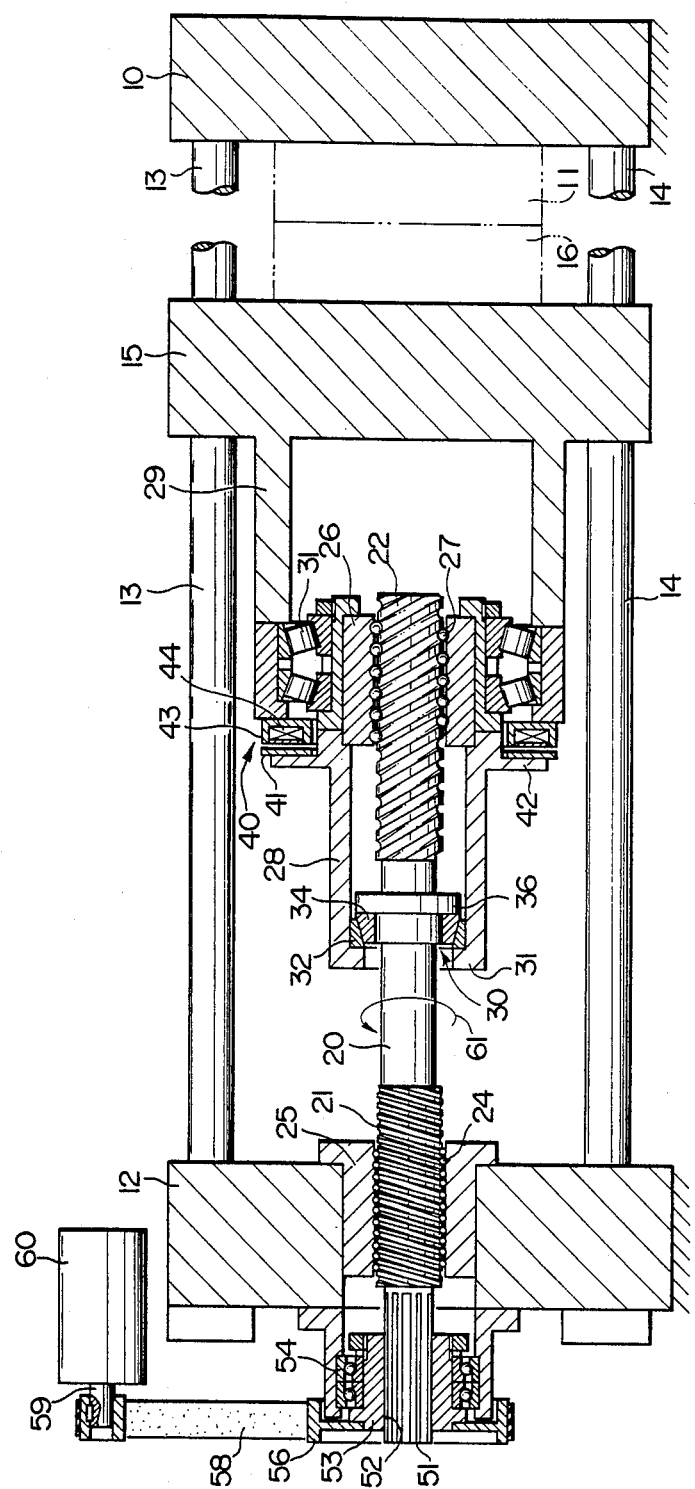
FIG. 2 is a partly sectional view of the first embodiment but showing a state wherein the movable platen shown in FIG. 1 is placed at a position where the mold is closed.

The first sliding clutch mechanism 30 is arranged such that it is placed at the engagement position shown in FIG. 2 immediately before the mold part 16 held by the movable platen 15 comes into contact with the other mold part 11 held by the fixed platen 10 after the mold-closing step has further proceeded. In addition, when a pair of the mold parts 11 and 16 come into contact with each other, a detecting mechanism (not shown) supplies a signal to the second sliding clutch mechanism 40, thereby de-energizing the solenoid 44. The aforesaid arrangement allows the housing 28 to rotate together with the shaft 20 with the clutch component 41 of the second sliding clutch mechanism 40 brought into sliding contact with the clutch component 43 of the same immediately before the mold closure. Upon completion of the mold closure, the arrangement also allows the housing 28 to rotate together with the shaft 20 without the clutch component 41 of the second sliding clutch mechanism 40 brought into sliding contact with the clutch component 43 of the same. Therefore, no relative movement occurs between the threaded portion 22 and the nut member 26 and thus the shaft 20 is caused to travel at a relatively low speed only by the cooperation between the threaded portion 21 having a smaller lead and the corresponding nut member 25. This produces a large mold clamping force, and the mold-clamping step is performed by the large mold clamping force.

If the mold clamping is to be continued, the electrical motor 60 may be maintained in the state of generating a torque, or a motor with a brake may be employed so as to hold the mold clamping force via the brake mechanism.

Mold opening is performed in the following manner. The electrical motor 60 is reversed with the second sliding clutch mechanism 40 maintained in its engagement position, and the first sliding clutch mechanism 30 is disengaged. As in the case of the mold closing, the shaft 20 is made to travel at high speed in the direction counter to that of mold closure by the cooperation between the threaded portion 21 and the nut member 25 as well as by the cooperation between the threaded portion 22 and the nut member 26. Thus, the mold opening step is performed.

It is to be noted that, in order to obtain a large mold-clamping force in the aforesaid mold-closing step, it is necessary that the mold parts 11 and 16 come into contact with each other after the first sliding clutch mechanism 30 has been placed in its engagement position. Therefore, when an old mold is to be replaced with a new mold, the second sliding clutch mechanism 40 is placed in its engagement position, prior to the mounting of the new mold, the electrical motor 60 being activated to move the movable platen 15, thereby engaging the clutch mechanism 30. Subsequently, the clutch mechanism 40 is disengaged and the aforesaid motor 60 is reversed, thereby moving the movable platen 15 backwards. Thus, the interval between the fixed platen 10 and the movable platen 15 is adjusted so that the interval may be made slightly wider than the thickness of the new mold.

As described above, in the first preferred embodiment of the present invention, the opening and closing of a mold can be performed at high speed with simultaneous use of the two threaded portions whose respective thread directions are opposite to each other. In addition, rigid mold clamping can be performed with the use of either of the threaded portions. Accordingly, the operation of the injection molding machine can be performed effectively and positively by means of an electrical motor having a small capacity, this being favorable for high-cycle molding and in terms of the cost and electrical capacity. Moreover, since the overall length of the shaft is made shorter than that of the prior art, the overall size of the injection molding machine can be reduced.

Figure 3:
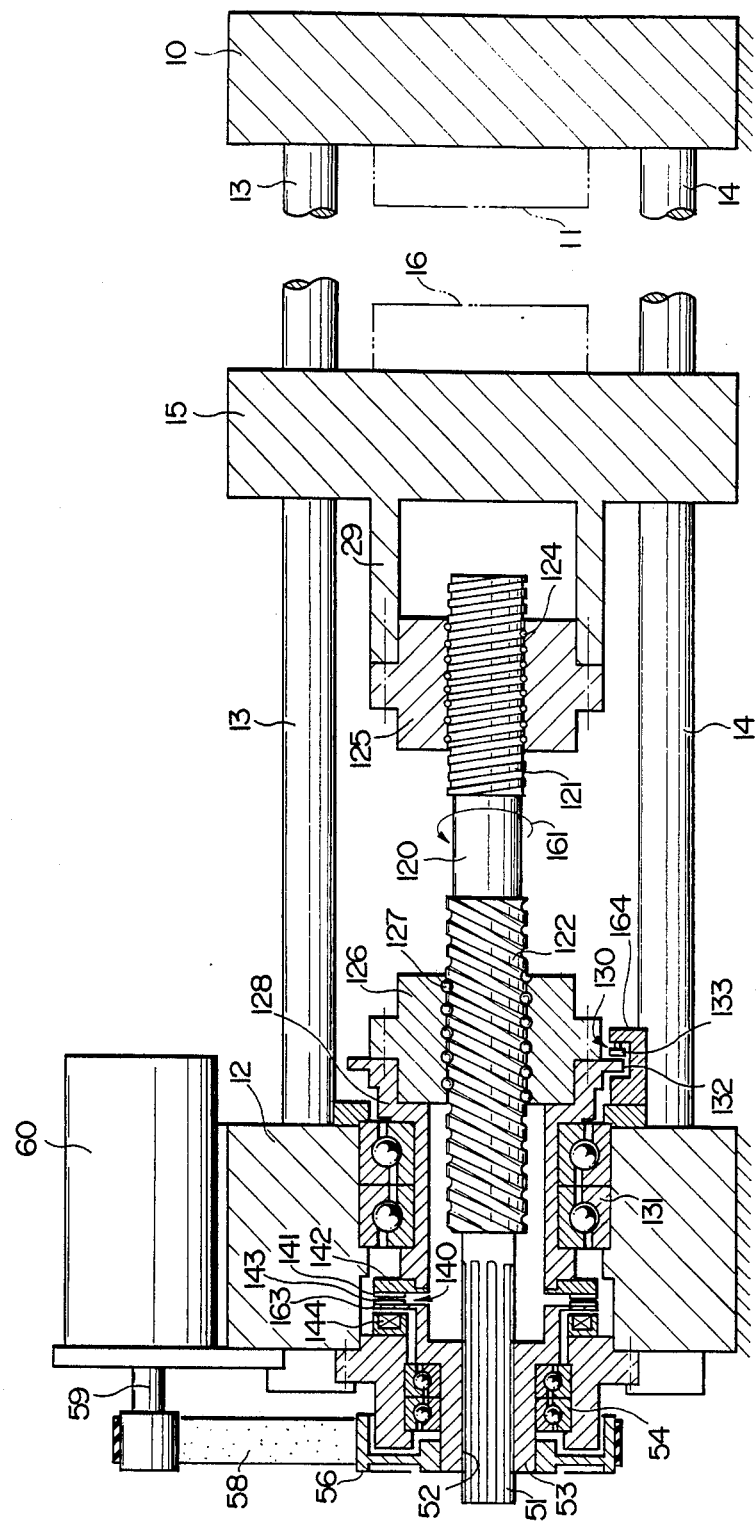
FIG. 3 is a view similar to FIG. 1 but showing a second preferred embodiment of the present invention.

FIG. 3 partly shows a second preferred embodiment of the injection molding of the present invention. In FIG. 3, like reference numerals are used to denote the like or corresponding components and parts that are shown in FIGS. 1 and 2. Detailed description of the invention is therefore omitted with respect to such like or corresponding components and parts.

A shaft 120 used in the second embodiment shown in FIG. 3 is provided with threaded portions 121 and 122 having threads which spiral in the opposite directions to each other, the former having a lead which is smaller than that of the latter.

A nut member 125 is screwed onto the threaded portion 121 via a plurality of balls 124, and the nut member 125 is secured to the cylindrical projection 29 of the movable platen 15. Also, a nut member 126 is screwed onto the threaded portion 122 via a plurality of balls 127, the nut member 126 being secured to a tubular housing 128. The housing 128 is, in turn, rotatably supported via a bearing 131 on the stationary frame 12.

A first sliding clutch mechanism 130 is provided between the housing 128 and the stationary frame 12. The first sliding clutch mechanism 130 includes: a clutch component 132 formed by an outward flange integral with the housing 128; a bracket 164 secured to the stationary frame 12; and a clutch component 133 supported for movement along the axis of the shaft 120. The first sliding clutch mechanism 130 is arranged to take the disengagement position shown in FIG. 3 in which the clutch component 133 is separated from the clutch component 132 and to take an engagement position (not shown) in which the clutch component 133 is maintained in frictional engagement with the clutch component 132.

A second sliding clutch mechanism 140 is provided between the housing 128 and the rotary member 53. The second sliding clutch mechanism 140 includes: a clutch component 141 made of a magnetic material which is disposed on an outward flange member 142 secured to the housing 128; a clutch component 143 secured to an outward flange 163 integral with the rotary member 53; and a solenoid 144 secured to the stationary frame 12. The clutch component 141 is supported on the housing 128 for movement along the axis of the shaft 120 but for non-rotation with respect to the housing 128, and is pressed by a spring (not shown) in the direction away from the clutch component 143. While the solenoid 144 is being de-energized, the clutch component 141 is held away from the clutch component 143 by means of the spring (not shown) and the second sliding clutch mechanism 140 takes the disengagement position shown in FIG. 3. When the solenoid 144 is energized, the clutch component 141 is attracted to the solenoid 144 against the force of the spring and comes into contact with the clutch component 143. Thus, the second sliding clutch mechanism 140 takes an engagement position (not shown).

The operation of the second embodiment shown in FIG. 3 will be described below. In a state wherein the mold is opened as shown in FIG. 3, an electrical signal indicative of the commencement of mold closing is fed to the electrical motor 60 to rotate the output shaft 59 and at the same time to cause the first sliding clutch mechanism 130 to move toward its engagement position, thereby rigidly coupling the housing 128 and the nut member 126 with respect to the stationary frame 12. Thus, the rotational output of the motor 60 is transmitted to the pulley 56 and the rotary member 53 via the belt 58, causing the shaft 120 to rotate in the direction indicated at 161 in FIG. 3. In this way, as in the case of the first embodiment described in connection with FIGS. 1 and 2, the movable platen 15 is made to travel in the mold-closing direction at high speed equivalent to the rotation of a hypothetical screw having a lead substantially equal to the sum of the respective leads of the threaded portions 121 and 122, whereby the mold closing step is performed.

At the final stage of mold closing, detecting means such as a contactless switch is operated to detect the fact that the mold part 16 held by the movable platen 15 and the mold part 11 held by the fixed platen 10 approach each other. In response to the thus-detected signal, the first sliding clutch mechanism 130 is caused to move to its disengagement position and at the same time the second sliding clutch mechanism 140 is caused to move to its engagement position. Thus, the rotational output of the motor 60 is transmitted to the housing 128 as well, so that the housing 128 is rotated together with the shaft 120. As in the case of the aforesaid first embodiment, a large mold clamping force is produced only by the cooperation between the threaded portion 121 having a smaller lead and the nut member 125, and thus the mold clamping step is performed by the large mold clamping force.

The mold clamping may be continued as in the case of the aforesaid first embodiment.

Mold opening is performed in the following manner. After the electrical motor 60 has been reversed to remove the mold clamping force, the first sliding clutch mechanism 130 is moved to its engagement position and the second sliding clutch mechanism 140 is moved to its disengagement position. The electrical motor 60 is further reversed, thereby performing the mold opening at high speed as in the case of the mold closing.

The above-described second embodiment provides substantially the same effect as that of the first embodiment.

Figure 4:
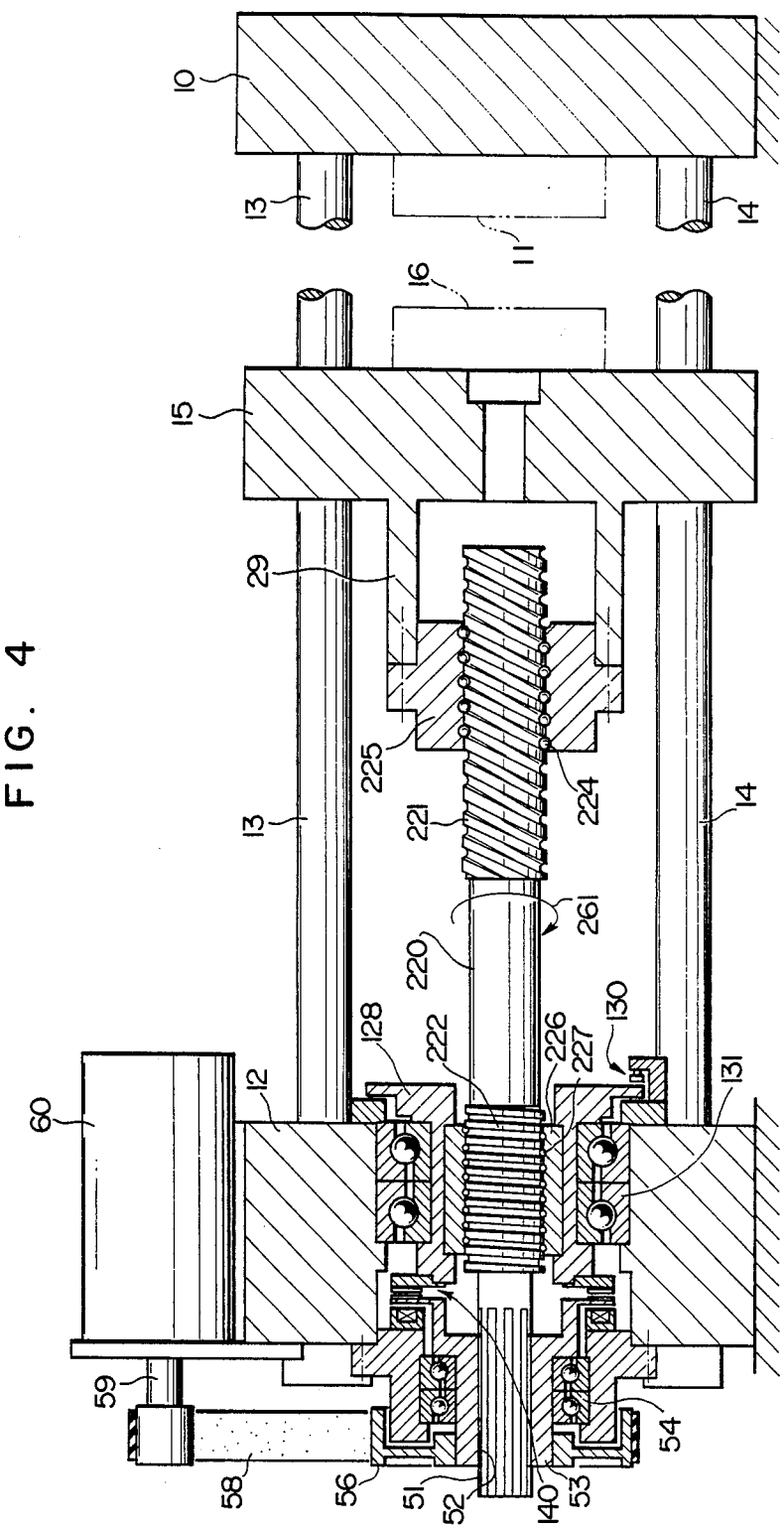
FIG. 4 is a view similar to FIG. 1 but showing a third preferred embodiment of the present invention.

FIG. 4 partly shows a third embodiment of an injection molding machine in accordance with the present invention. In FIG. 4, like reference numerals are used to denote the like or corresponding components and parts that are shown in FIG. 3. Detailed descriptions are therefore omitted with respect to such like or corresponding components and parts.

A shaft 220 used in the third embodiment shown in FIG. 4 is provided with threaded portions 221 and 222 having threads which spiral in the same directions as each other, the former having a lead which is larger than that of the latter.

A nut member 225 is screwed onto the threaded portion 221 via a plurality of balls 224, and the nut member 225 is secured to the cylindrical projection 29 of the movable platen 15. Also, a nut member 226 is screwed onto the threaded portion 222 via a plurality of balls 27, the nut member 226 being secured to the housing 128 which is supported as in the case of the second embodiment shown in FIG. 3.

Also, as in the case of the second embodiment shown in FIG. 3, the first sliding clutch mechanism 130 is provided between the housing 128 and the stationary frame 12 while the second sliding clutch mechanism 140 is provided between the housing 128 and the rotary member 53.

The other construction of the third embodiment shown in FIG. 4 is the same as that used in the second embodiment. Therefore, detail description thereof is omitted.

The operation of the third embodiment shown in FIG. 4 is described below. In a state wherein the mold is opened as shown in FIG. 4, an electrical signal indicative of the commencement of mold closing is supplied to the electrical motor 60 to cause rotation of the output shaft 59. The rotational output of the aforesaid motor 60 is transmitted via the belt 58 to the pulley 56 and the rotary member 53, and thus the shaft 220 is rotated together with the rotary member 53 in the direction indicated by an arrow 261 shown in FIG. 4. Simultaneously with the rotation of the output shaft of the motor 60, the second sliding clutch mechanism 140 is moved to its engagement position, thereby rigidly coupling the rotary member 53 with the housing 128. In consequence, the housing 128 is rotated together with the shaft 220. No relative movement occurs between the threaded portion 222 and the nut member 226, but a relative movement is produced between the threaded portion 221 and the nut member 225. Therefore, the movable platen 15 is moved at high speed by the cooperation between the threaded portion 221 having a larger lead and the nut member 225 in the direction in which the mold is closed, with the stationary frame 12 serving as a reaction receiver, thereby performing the mold-closing step. The speed at which the movable platen 15 travels at this step is determined by a combination of the lead of the threaded portion 221 and the rotational speed of the shaft 220.

At the final stage of mold closing, detecting means such as a contactless switch is operated to detect the fact that the mold part 16 held by the movable platen 15 and the mold part 11 held by the fixed platen 10 approach each other. In response to the thus-detected signal, the second clutch mechanism 140 is caused to travel to its disengagement position and at the same time the first sliding clutch mechanism 130 is caused to travel to its engagement position, thereby rigidly coupling the housing 128 with the stationary frame 12. Thus, the shaft 220 is moved with respect to the nut member 226 in the direction counter to that of mold closure by the cooperation between the threaded member 222 having a smaller lead and the nut member 226 secured to the housing 128 and at the same time the shaft 220 is forced to travel with respect to the nut member 225 in the same direction by the cooperation between the threaded portion 221 having a larger lead and the nut member 225 secured to the movable platen 15. Therefore, the movable platen 15 is moved in the direction in which the mold is closed and at a low speed equivalent to the rotation of a hypothetical screw having a lead substantially equal to the subtraction of the lead of the threaded portion 222 from that of the threaded portion 221. In consequence, mold clamping force is produced, and the mold clamping step is performed by means of the mold clamping force.

The mold clamping force is as follows:

$$F = \frac{2\pi T}{(A_3 - A_2) \times 10^{-3}}$$

where F(kgf) represents the mold clamping force, $A_3$ (mm) representing the lead of the threaded portion 221, $A_2$ (mm) representing the lead of the threaded portion 222, T(kg—m) representing the torque of the shaft 220 and the conversion efficiencies from the torque of the respective nut members 221 and 222 to the axial motion of the shaft 220 being 100%.

As will be understood from the aforesaid equation, if the value of $A_3-A_2$ is reduced, a large mold clamping force can be obtained by a small torque. Accordingly, although the third embodiment shown in FIG. 4 is an example in which the single shaft 220 is driven by the single electrical motor 60 incorporated in a single injection molding machine, the third embodiment is also effective in driving the shafts of a plurality of injection molding machines by means of the common electrical motor 60.

The mold clamping may be continued as in the case of the first embodiment.

The mold opening is performed as follows. After the electrical motor 60 has been reversed to remove the mold clamping force, the first sliding clutch mechanism 130 is located at its disengagement position while the second sliding clutch mechanism 140 is moved to its engagement position. In addition, the electrical motor 60 is reversed, thereby performing the mold opening at high speed as in the case of mold closing.

In the third embodiment of the present invention shown in FIG. 4, the opening and closing of the mold can be performed at high speed with the use of either of the two threaded portions which spiral in the same directions as each other. Use of both threaded portions enables rigid clamping of the mold, so that it is possible to achieve the same effect as that of the first embodiment.

Although the respective embodiments of the present invention have been described above, the present invention is not confined solely to the particular embodiments and various modifications can be employed. As an example, although the first and the second embodiments show the two threaded portions having different leads, they may have the same lead. Also, while reference is illustratively made to the structure in which the movable platen holding one of the mold parts is moved directly by the electrical motor via the shaft, the invention is applicable to the case where the cross head of a toggle type mold closing apparatus is to be moved. Accordingly, the term "movable platen" used in the present specification should be construed as including the cross head. In addition, while it is illustratively stated that one of the mold parts is held by the fixed platen, it may be supported by a mold holding member disposed for reciprocal movement with respect to the fixed platen.

Industrial Applicability

The present invention described above is applicable to a molding machine of any type which employs a pair of mold parts as in the case of an injection molding machine and which is arranged to perform molding by moving the pair of mold parts toward and away from each other.

What is claimed is:

1. A molding machine which is arranged to perform molding by means of at least one mold constituted by a pair of mold parts, comprising:
   a stationary frame;
   a fixed platen holding one of said pair of mold parts;
   a movable platen holding the other of said pair of mold parts, said movable platen being attached to said stationary frame for reciprocal movement with respect to said fixed platen in a direction toward and away from said one of said pair of mold parts;
   a shaft having an axis extending toward said movable platen, said shaft being supported for rotation with respect to said stationary frame and for reciprocal movement along said axis of said shaft, said shaft having first and second threaded portions formed thereon along said axis of said shaft;
   an electrical motor mounted on said stationary frame for causing rotation of said shaft;
   first and second nut members screwed onto said respective first and second threaded portions of said shaft, said first nut member being secured to one of said stationary frame and said movable platen, said first nut member and said shaft being movable with respect to each other when said shaft is rotated, said second nut member capable of being rigidly coupled with the other of said stationary frame and said movable platen; and
   clutch means disposed between said other of said stationary frame and said movable platen and said second nut member for free movement between an engagement position which allows for relative movement between said shaft and said second nut member while said shaft is being rotated with said second nut member rigidly coupled with said other of said stationary frame and said movable platen and a disengagement position which allows said shaft to be rotated together with said second nut member while said shaft is being rotated with said second nut member released from rigid coupling with respect to said other of said stationary frame and said movable platen.

2. A molding machine according to claim 1, wherein said first and second threaded portions spiral in opposite directions to each other, said first nut member being secured to said stationary frame and said clutch means including a first sliding clutch mechanism disposed between said second nut member and said shaft and a second sliding clutch mechanism disposed between said second nut member and said movable platen.

3. A molding machine according to claim 2, wherein said first threaded portion has a lead smaller than that of said second threaded portion.

4. A molding machine according to claim 1, wherein said first and second threaded portions spiral in opposite directions to each other, said first nut member being secured to said movable platen and said clutch means including a first sliding clutch mechanism disposed between said second nut member and said shaft and a second sliding clutch mechanism disposed between said second nut member and said stationary frame.

5. A molding machine according to claim 4, wherein said first threaded portion has a lead smaller than that of said second threaded portion.

6. A molding machine according to claim 1, wherein said first and second threaded portions spiral in identical direction, said first nut member being secured to said movable platen and said clutch means including a first sliding clutch mechanism disposed between said second nut member and said shaft and a second sliding clutch mechanism disposed between said second nut member and said stationary frame.

7. A molding machine according to claim 6, wherein said first threaded portion has a lead larger than that of said second threaded portion.

* * * * *